Sept. 1, 1964   F. L. BOYS ETAL   3,146,793
MULTI-PORT DELIVERY SHUTTLE VALVE
Filed Sept. 28, 1961
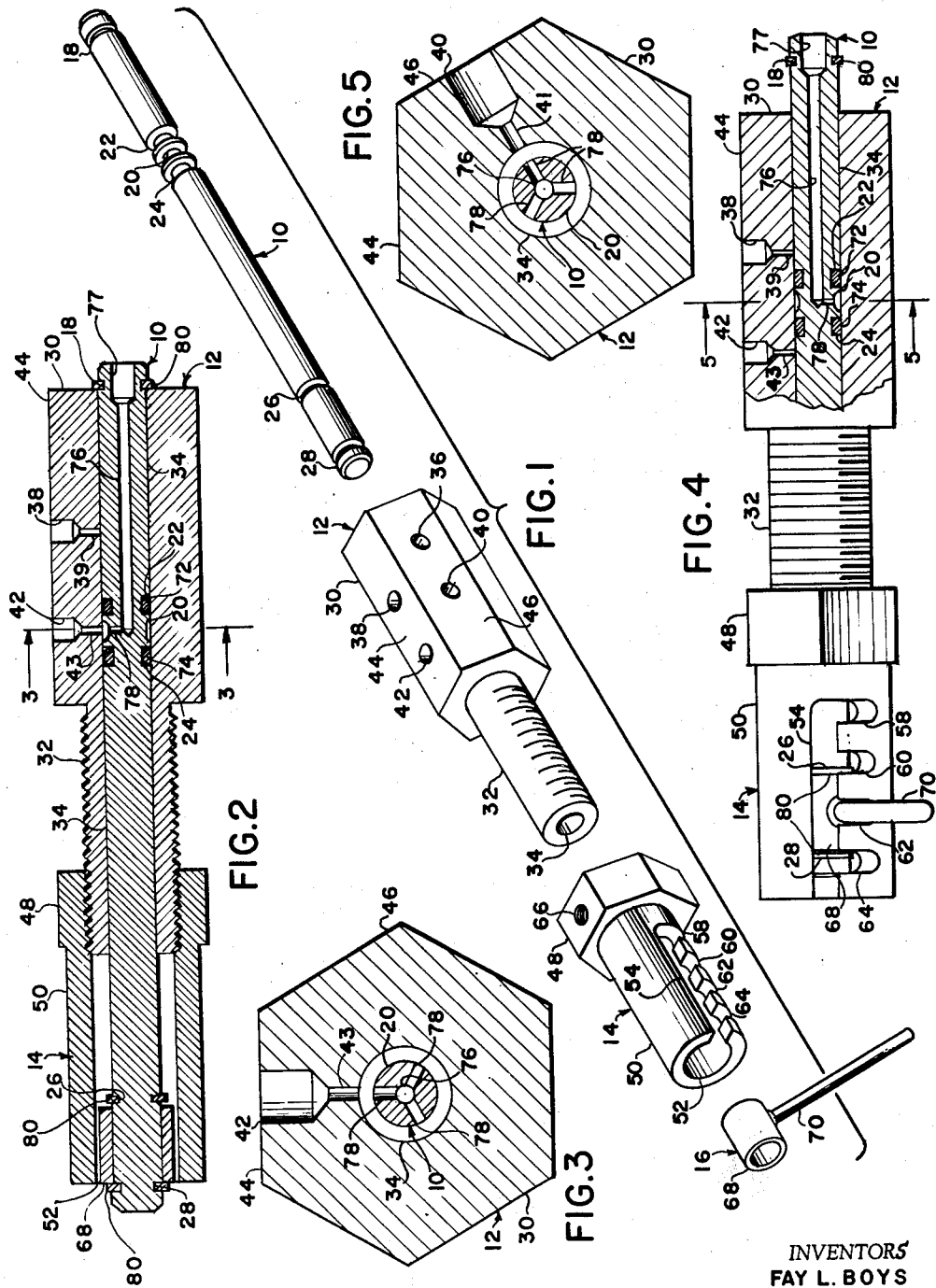
INVENTORS
FAY L. BOYS
JOHN VLASIC
JOHN A. PERRY
BY
Adams, Forward & McLean
ATTORNEYS

United States Patent Office 3,146,793
Patented Sept. 1, 1964

3,146,793
MULTI-PORT DELIVERY SHUTTLE VALVE
Fay L. Boys, Peotone, John Vlasic, Harvey, and John A. Perry, Lansing, Ill., assignors to Sinclair Research, Inc., Wilmington, Del., a corporation of Delaware
Filed Sept. 28, 1961, Ser. No. 141,357
1 Claim. (Cl. 137—625.11)

Our invention relates to a multi-port delivery shuttle valve. More particularly our invention relates to a multi-port delivery shuttle valve suitable for redirecting vapor laden carrier gas in gas chromatography which is especially suitable for operating at high temperatures.

In gas chromatography it is necessary to redirect the vapor laden carrier gas from one receiver to another as each successive component emerges from the chromatographic column. Due to the peculiar requirements of gas chromatography, especially the extremely small quantities employed and the accuracy of handling required, the common commercial variety of valve mechanisms are not suitable for such employment. Ideally, a valve for use in gas chromatography should be both quickly and easily operated. It should be of the type which does not require a lubricant, particularly a lubricant which will absorb vapors. Further, internal passageways of the valve should contain no dead space and the passageways themselves should have a small internal diameter of the order of 1/8 inch or less. In addition to these basic requirements it is also desirable that the valve can be employed at elevated temperatures, for example, about 500 to 600° F.

It is an object of our invention to provide a multi-port delivery valve that has such capabilities.

Briefly, our invention provides a valve for redirecting vapor laden carrier gas in gas chromatography which includes an elongated valve body with a cylindrical passageway extending longitudinally through such body. The valve body is also provided with a plurality of outlet passageways extending through the wall of the body communicating at their inner ends with the longitudinal passageway and communicating at their outer ends with the exterior of the valve body. The outlet passageways are positioned such that their inner ends are disposed along the length of the longitudinal passageway. A cylindrical core member is located within the longitudinal passageway of the valve body and is axially movable in the longitudinal passageway. Intermediate the ends of the core member is located a portion of reduced cross-section. The core member is also provided with a longitudinal passageway extending into the core member from one end and terminating within the core member at a point located beneath the surface of the portion of reduced cross-section. This longitudinal passageway connects with a transverse passageway which communicates with the exterior of the core member at the portion of reduced cross-section. The portions of the core member on either side of the portion of reduced cross-section are of such size and shape that they are maintained in sliding, vapor-tight contact with the surface of the cylindrical passageway through the valve body thereby defining an annular vapor-tight area between the valve body and the core member. The longitudinal distance between the outlet passageways in the valve body is greater than the longitudinal dimension of the annular vapor-tight area just described. The core member is also provided with a means, such as a handle, for axially moving the core member through a series of positions. At each of these positions the annular vapor-tight area registers with one of the outlet passageways in the valve body. Thus, it will be understood that since the longitudinal distance between the inner ends of the outlet passageways in the valve body is greater than the longitudinal dimension of the vapor-tight area, such area cannot be in communication with more than one of the transverse passageways in the valve body at any one time.

Advantageously, the core member is provided with O-rings on either side of the portion of reduced cross-section. Thus, the O-rings can be maintained in vapor-tight contact with the interior of the cylindrical passageway through the valve body while spacing the core member from the cylindrical passageway thereby eliminating contact of any substantial surface areas which effects a considerable reduction in the source of friction. Furthermore, since the O-rings are the only members in contact with the cylindrical passageway of the valve body the extremely critical burden of withstanding the adverse effects of high temperatures while in contact with the vapor laden carrier gas is removed from the other members. Thus, by employing O-rings composed of a material capable of withstanding the high temperatures encountered in operation while retaining its ability to effect a vapor-tight seal, the necessity of maintaining burdensome tolerances in machining the other parts or employing materials for the other parts which can be machined only with great difficulty is eliminated. An example of a suitable material for the O-rings is a copolymer of hexafluoropropylene and vinylidene fluoride. This material is a white, translucent solid having a specific gravity of about 1.82 and is capable of withstanding temperatures up to about 600° F. This copolymer is commercially available under the trade name of "Viton."

The means for effecting axial movement of the core member can include a sleeve coaxially affixed to the core member and having an arm projecting radially outward therefrom. When employing such sleeve and arm, the valve body can also have a longitudinal extension with a longitudinal slot therein. Communicating with the longitudinal slot are a plurality of lateral slots. These slots are designed to be of a size to accommodate the radial arm extending from the sleeve, whereby moving the arm through the longitudinal slot effects axial movement of the core member and each of the lateral slots functions as a means for positioning the core member within the valve body. In such an embodiment of our invention the radial arm is positioned a fixed distance from the portion of reduced cross-section of the core member and the lateral slots are spaced from the transverse passageways in the valve body at a distance equal to such fixed distance. Advantageously, the longitudinal extension of the valve body can be a separate piece adjustably attached to the main portion of the valve body, such as by threads.

To illustrate our invention more completely reference is made to the attached drawing in which:

FIGURE 1 is an exploded isometric view of the members comprising an embodiment of our invention.

FIGURE 2 is a sectional view showing the members illustrated in FIGURE 1 in one position as assembled.

FIGURE 3 is a cross-sectional view taken along the line 3—3 of FIGURE 2.

FIGURE 4 is a partially sectioned view similar to that of FIGURE 2 showing the members in a second position.

FIGURE 5 is a sectional view taken along the line 5—5 of FIGURE 4.

In FIGURE 1 is shown a generally cylindrical core member 10, a valve body 12, a valve body extension 14 and a core handle 16. Core member 10 is provided with a neck 18 near one end thereof. Intermediate the ends of core member 10 is an area of reduced cross-section 20. Located on either side of the area of reduced cross-section 20 and immediately adjacent thereto are two necks 22 and 24. Proximate the end of core member 10 remote from neck 18 are a pair of spaced apart necks 26 and 28.

As shown in FIGURE 1, the valve body 12 is divided generally into two sections, one being a hexagonal section 30 and the other being an externally threaded cylindrical section 32. Also shown in FIGURE 1 is one end of a longitudinal cylindrical passageway 34 which extends through the center of valve body 12. The hexagonal section 30 is provided with four gas ports 36, 38, 40 and 42 communicating with cylindrical passageway 34 and the exterior of valve body 12 and spaced longitudinally equal distances apart. It will be seen that gas ports 38 and 42 are located on the top face 44 of hexagonal section 30 while gas ports 36 and 40 are located in the adjacent face 46.

The valve body extension 14 is provided with a hexagonal head 48 at the end thereof proximate the cylindrical section 32 of valve body 12 and a longitudinally extending cylinder 50 at the other end. Also shown in this figure is one end of a longitudinal cylindrical passageway 52 which extends through the center of valve body extension 14. Cylinder 50 is provided with a longitudinal slot 54 opening at the end of cylinder 50 remote from the hexagonal head 48 and four lateral slots 58, 60, 62 and 64 communicating with longitudinal slot 54. These slots 54, 58, 60, 62 and 64 extend through the wall of cylinder 50 to longitudinal passageway 52. A threaded hole 66 is also shown extending into one of the faces of hexagonal head 48.

The core handle 16 is composed of a hollow sleeve 68 and an arm 70 extending radially from sleeve 68.

Referring now to FIGURE 2 the members illustrated in FIGURE 1 are shown assembled. Thus, it can be seen that core member 10 is slidably received within the longitudinal cylindrical passageway 34 of valve body 12 and extends through the longitudinal cylindrical passageway 52 of valve body extension 14 so that the end of core member 10 provided with neck 18 is proximate the hexagonal section 30 of valve body 12 and the end of core member 10 containing the pair of spaced apart necks 26 and 28 is proximate the end of cylinder 50 at which slot 54 opens. The hollow sleeve 68 of core handle 16 is shown disposed intermediate necks 26 and 28 of core member 10. It can also be seen that the portion of longitudinal cylindrical passageway 52 underlying the hexagonal head 48 of valve body extension 14 is provided with threads which engage the threaded cylinder 32 so that the hexagonal section 30 of valve body 12 is located remote from the cylinder 50 of valve body extension 14. It will be further noticed that gas ports 38 and 42 are provided with sections of reduced diameter 39 and 43, respectively, and that gas ports 38 and 42 together with their sections of reduced diameter provide communication between longitudinal cylindrical passageway 34 and the exterior of valve body 12. A longitudinal passageway 76 together with a section of enlarged diameter 77 is shown extending longitudinally inward from the end of core member 10 proximate neck 18 with the longitudinal passageway 76 terminating beneath the area of reduced cross-section 20 of core member 10. The core member 10 is also provided with three transverse passageways 78 interconnecting longitudinal passageway 76 and the exterior of core member 10 at the area of reduced cross-section 20. (Only one transverse passageway 78 is shown in FIGURE 2.) A pair of O-rings 72 and 74 are also shown positioned in necks 22 and 24, respectively, and disposed to bear against the wall of longitudinal cylindrical passageway 34 in sliding, sealing contact therewith.

In FIGURE 3 can be seen an enlarged sectional view taken through the hexagonal section 30 of valve body 12 showing gas port 42 together with its section of reduced diameter 43 and core member 10 together with its portion of reduced cross-section 20. Also shown is the cylindrical passageway 76 centrally located within core member 10 and communicating with the three transverse passageways 78. It can now be seen that a path of communication between the interior of core member 10 and the exterior of valve body 12 is provided by means of cylindrical passageway 76, transverse passageways 78, the area of reduced cross-section 20 and gas port 42 together with its section of reduced diameter 43.

Referring now to FIGURE 4, core member 10 is shown in a different position from that illustrated in FIGURE 2. In this figure the arm 70 of core handle 16 is shown engaged in lateral slot 62 of valve body extension 14. It will also be noticed that the portion of reduced cross-section 20 no longer registers with the section of reduced diameter 43 of gas port 42 as illustrated in FIGURES 2 and 3. The sectional view illustrated in FIGURE 5, however, shows that the area of reduced cross-section 20 now registers with the section of reduced diameter 41 of gas port 40 which extends into the face 46 of the hexagonal section 30 of valve body 12.

In operation the core member 10, valve body 12, valve body extension 14 and core handle 16 are assembled generally as shown in FIGURES 2 or 4 by threading the valve body extension 14 onto the threaded cylinder 32 of the valve body 12. The distance between gas ports 36, 38, 40 and 42 and lateral slots 58, 60, 62 and 64, respectively, can be adjusted such that when the arm 70 of core handle 16 is engaged in one of the lateral slots the area of reduced cross-section 20 registers with the section of reduced diameter of the corresponding gas port. Once the proper spacing has been obtained a set screw can be inserted in the threaded hole 66 so as to maintain the valve body 12 and the valve body extension 14 in a fixed relationship. As shown in the drawing, the core handle 16 can be operably connected to the core member 10 by placing a spring clip or washer 80 in each of necks 26 and 28 thereby permitting the collar 68 to rotate freely about core member 10 yet permitting the transmission of axial movement from the arm 70 to the core member 10. A spring clip or washer 80 is also shown positioned in neck 18 at the other end of core member 10 in order to prevent the movement of core member 10 beyond the point at which the portion of reduced cross-section 20 registers with a gas port. Thus, a conduit can be connected in communication with the passageway 76 of core member 10 by inserting the conduit into the section of enlarged diameter 77 and then sealing it in place as by soldering or brazing. Similarly, a plurality of conduits can be connected in communication one to each of the gas ports 36, 38, 40 and 42. Thus, for example, a vapor laden carrier gas can be directed through a suitable conduit into longitudinal passageway 76, through the transverse passageways 78 and into the area of reduced cross-section 20 which, as illustrated in FIGURE 2, communicates with the section of reduced diameter 43 of gas port 42. In such situation the arm 70 of core handle 16 is engaged in lateral slot 64. As the next successive component emerges from the chromatographic column, the arm 70 can easily and rapidly be removed from lateral slot 64 and moved so as to be engaged by lateral slot 62. In this situation the vapor laden carrier gas is directed through longitudinal passageway 76 and transverse passageways 78 into the area of reduced cross-section 20, which, as shown in FIGURE 5, communicates with the area of reduced diameter 41 of gas port 40. Similarly, radial arm 70 can be moved so as to be engaged by lateral slots 60 and 58, consecutively, thereby redirecting the vapor laden carrier gas to gas ports 38 and 36, respectively.

Thus, in the embodiment of our invention shown in the drawing the core member 10, the valve body 12 and the core handle 16 can be fabricated from a material such as stainless steel while the valve body extension 14 can be composed of a material such as brass. In fabricating the core handle 16, the arm 70 can easily be attached to the hollow sleeve 68 by employing silver solder. The O rings 72 and 74 can be composed of a material such as Viton described above. Also, in such an embodiment the longitudinal passageway 76 in core member 10 can be about 1/16 inch in diameter and the three transverse passageways 78 with which passageway 76 connects can be about 1/32 inch in diameter. The major O.D. of core member 10 can be about 1/4 inch, for example, .247 inch. The smallest diameter of the area of reduced cross section 20 is about 7/32 inch. When the core member 10 is of the dimensions just mentioned, the diameter of the longitudinal cylindrical passageway 34 of valve body 12 is about 1/4 inch, for example, .248 inch. It will be noticed then that a clearance of about .002 inch is maintained between core member 10 and the wall of longitudinal cylindrical passageway 34. As mentioned in the description of the drawing a pair of O rings 72 and 74 are located in necks 22 and 24, respectively, so as to maintain sliding, sealing contact with the wall of longitudinal cylindrical passageway 34. The annular volume between the area of reduced cross section 20 and the wall of longitudinal cylindrical passageway 34 defined by the O rings 72 and 74 has an effective length of about 1/4 inch with an I.D. of approximately 7/32 inch and O.D. of about 1/4 inch. Further, the gas ports 36, 38, 40 and 42 can have a diameter of 1/8 inch and their sections of reduced diameter 37, 39, 41 and 43, respectively, can have a diameter of 1/32 inch. It can be seen, therefore, that in an embodiment of our invention such as that illustrated in the drawing none of the passageways have a diameter greater than 1/8 inch and in fact the majority of the passageways, particularly those in the critical area, have diameters substantially less than 1/8 inch, to wit 1/16 inch and 1/32 inch. Moreover, due to the employment of the O rings composed of a material such as Viton not only is the need for a lubricant eliminated but the device is also capable of operating at temperatures up to about 600° F.

We claim:

An apparatus for redirecting vapor laden carrier gas in gas chromatography which includes an elongated valve body having means defining a cylindrical passageway longitudinally therethrough, means defining a plurality of outlet passageways extending through the wall of said valve body communicating with said longitudinal passageway at their inner ends and communicating with the exterior of said valve body at their outer ends, said outlet passageways positioned such that their inner ends are disposed along the length of said longitudinal passageway, a cylindrical core member disposed in said longitudinal cylindrical passageway of said valve body and axially movable therein, said core member having a portion of reduced cross-section intermediate the ends thereof, means defining a longitudinal passageway extending into said core member from one end thereof and terminating within said core member proximate said portion of reduced cross-section, means defining a passageway extending through said core member transversely to said longitudinal passageway therein communicating with the exterior of said core member at said portion of reduced cross-section at the outer end thereof and communicating with said longitudinal passageway therein at the inner end thereof, the portions of said core member adjacent said portion of reduced cross-section being in sliding vapor-tight contact with said longitudinal cylindrical passageway through said valve body thereby defining an annular vapor-tight area between said valve body and said core member about said portion of reduced cross-section, the longitudinal distance between said outlet passageways in said valve body being greater than the longitudinal dimension of said annular vapor-tight area, and means connected to said core member for effecting axial movement thereof through a series of positions, at each different one of said positions said annular vapor-tight area registering with a different one of said plurality of outlet passageways in said valve body, said means connected to said core member including a sleeve rotatably, coaxially affixed to said core member having an arm projecting radially outward therefrom, and a longitudinal extension of said valve body having a longitudinal slot therein and having a plurality of lateral slots disposed along the length of said longitudinal slot and communicating therewith, said longitudinal extension comprising a separate piece adjustably, threadedly attached to the valve body, said arm being disposed a predetermined length from said portion of reduced cross-section, a said lateral slot in said extension corresponding to each said outlet passageway in said valve body and disposed said predetermined length therefrom, said arm extending into said slots and cooperating therewith; whereby said annular vapor-tight area registers with one of said outlet passageways in said valve body when said arm cooperates with one of said lateral slots.

References Cited in the file of this patent

UNITED STATES PATENTS

| | | |
|---|---|---|
| 2,010,088 | Kohler | Aug. 6, 1935 |
| 2,842,124 | James | July 8, 1958 |